United States Patent [19]

Herring, Sr.

[11] Patent Number: 5,474,206
[45] Date of Patent: Dec. 12, 1995

[54] CULINARY ASSEMBLY WITH AN INTERLOCKING BOWL AND BASE

[76] Inventor: James R. Herring, Sr., 200 Church St., Apt. 112, Boaz, Ala. 35957

[21] Appl. No.: 239,565

[22] Filed: Jul. 5, 1994

[51] Int. Cl.⁶ .................................................. B65D 25/00
[52] U.S. Cl. ........................................ 220/636; 220/630
[58] Field of Search ................................ 220/636, 603, 220/615, 630, 638

[56] References Cited

U.S. PATENT DOCUMENTS

| | | | |
|---|---|---|---|
| 118,995 | 9/1871 | Wetjen | 220/636 |
| 543,937 | 8/1895 | Hurley | 220/636 |
| 1,719,473 | 7/1929 | Hron | 220/636 |
| 1,751,344 | 3/1930 | Mason | 220/636 |
| 3,812,995 | 5/1974 | Lewis | 206/636 |
| 4,484,682 | 11/1984 | Crow | 220/636 |

FOREIGN PATENT DOCUMENTS

| | | | |
|---|---|---|---|
| 1193070 | 3/1958 | France | 206/638 |
| 490676 | 2/1954 | Italy | 220/636 |
| 110038 | 3/1944 | Sweden | 220/636 |

*Primary Examiner*—Joseph M. Moy

[57] ABSTRACT

A culinary assembly with an interlocking bowl and base comprising a bowl formed in a hollow generally cylindrical configuration with an open top end and an enclosed, generally planar circular bottom end. The bottom end includes an upper surface and a lower surface. A stationary base is formed of a flat plate and a stationary tub. The plate is formed in a planar configuration with an upper surface and a lower surface. The upper surface includes an upwardly extending, generally cylindrically shaped tub. The tub has an open top section and a bottom section positioned on top of the upper surface of the plate. A locking mechanism securely couples the bowl in the operative orientation upon the base.

2 Claims, 4 Drawing Sheets

5,474,206

1

CULINARY ASSEMBLY WITH AN INTERLOCKING BOWL AND BASE

BACKGROUND OF THE INVENTION

1. Field of the Invention

The present invention relates to a culinary assembly with an interlocking bowl and base and more particularly pertains to holding culinary bowls in a fixed position to allow stirring of the contents without rotation of the bowl.

2. Description of the Prior Art

The use of bowl stand bases is known in the prior art. More specifically, bowl stand bases heretofore devised and utilized for the purpose of supporting and securing bowls are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 3,683,452 to Rickmeier, Jr. et al. a handle construction for a bowl.

U.S. Patent Number Des. 293,993 to Durand discloses a footed bowl or similar article.

U.S. Patent Number Des. 249,770 to Benes discloses a base for a bowl.

U.S. Patent Number Des. 258,152 to Robert discloses a holder for a pet food bowl.

Lastly, U.S. Patent Number Des. 248,005 to Harshman et al. discloses a footed oval bowl.

In this respect, the culinary assemblies with an interlocking bowl and base according to the present invention substantially departs from the conventional concepts and designs of the prior art, and in doing so provides an apparatus primarily developed for the purpose of holding culinary bowls in a fixed position to allow stirring of the contents without rotation of the bowl.

Therefore, it can be appreciated that there exists a continuing need for a new and improved culinary assembly with an interlocking bowl and base which can be used for holding culinary bowls in a fixed position to allow stirring of the contents without rotation of the bowl. In this regard, the present invention substantially fulfills this need.

SUMMARY OF THE INVENTION

In view of the foregoing disadvantages inherent in the known types of bowl stand bases now present in the prior art, the present invention provides an improved culinary assembly with an interlocking bowl and base. As such, the general purpose of the present invention, which will be described subsequently in greater detail, is to provide a new and improved culinary assembly with an interlocking bowl and base and method which has all the advantages of the prior art and none of the disadvantages.

To attain this, the present invention essentially comprises a new and improved culinary assembly with an interlocking bowl and base comprising a bowl formed in a hollow generally cylindrical configuration with an open top end and an enclosed, generally planar circular bottom end. The top end has a larger circumference than the bottom end, with the side wall of the bowl having a gradually decreasing circumference therebetween. The sidewall includes an inner surface and an outer surface with a small thickness therebetween. The bottom end has an upper surface and a lower surface with a large thickness therebetween. The bowl includes coupling means located in a small area near its top end. The bowl also includes a generally rectangular shaped handle affixed near its open top end. The handle is of a sufficient length for a user to grip comfortably. A stationary base is formed of a flat plate and a stationary tub. The plate is formed in a planar generally rectangular configuration with parallel long sides and parallel short sides. The plate has an upper surface and a lower surface. The upper surface includes an upwardly extending generally cylindrically shaped tub. The tub has an open top section and a bottom section formed contiguously with the upper section of the plate. The top end has a larger circumference than the bottom end, with the cylindrical side wall of the tub having a gradually decreasing circumference therebetween. A lock mechanism includes a releasably coupled tang and an undercut recess. The tang extends upwardly from the bottom section of the tub and is formed in T-shaped configuration. The tang has a generally cylindrical shaped lower portion which is contiguous with a rectangular shaped upper portion. The lower portion is affixed to the bottom section of the tub and has a short vertical height. The upper portion has parallel long sides, parallel short sides and a small thickness. The recess is centrally located in the lower surface of the bottom end. The outermost portion of the recess is contiguous with the lower surface of the bottom section and shaped in a generally rectangular configuration with parallel long sides and parallel short sides. The innermost portion of the recess is located deeper within the bottom section than the outermost portion. The innermost portion is formed in a hollow, generally cylindrical configuration with a long, generally circular side, and two short straight sides angled toward the axis of the cylinder. The two short sides meet to form right angles. The innermost portion has a roof section with a generally rectangular shaped opening formed contiguously with the generally rectangular shaped outermost portion of the recess. The lock mechanism is adapted to be securely positioned within the undercut recess when in the operative orientation. Four suction cups are affixed to the lower surface of the stationary base near each of its four corners. Each cup is shaped in a generally semi-spherical configuration with its rounded end affixed to the base. The open end of each cup is adapted to securely stick to a mounting surface.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved culinary assembly with an interlocking bowl and base which have all the advantages of the prior art bowl stand bases and none of the disadvantages.

It is another object of the present invention to provide a new and improved culinary assembly with an interlocking bowl and base which may be easily and efficiently manufactured and marketed.

It is further object of the present invention to provide a new and improved culinary assembly with an interlocking bowl and base which are of durable and reliable constructions.

An even further object of the present invention is to provide a new and improved culinary assembly with an interlocking bowl and base which is susceptible of a low cost of manufacture with regard to both materials and labor, and which accordingly are then susceptible of low prices of sale to the consuming public, thereby making such a culinary assembly with an interlocking bowl and base economically available to the buying public.

Still yet another object of the present invention is to provide a new and improved culinary assembly with an interlocking bowl and base which provide in the apparatuses and methods of the prior art some of the advantages thereof, while simultaneously overcoming some of the disadvantages normally associated therewith.

Still another object of the present invention is to hold culinary bowls in a fixed position to allow stirring of the contents without rotation of the bowl.

Lastly, it is an object of the present invention to provide a new and improved culinary assembly with an interlocking bowl and base comprising a bowl formed in a hollow generally cylindrical configuration with an open top end and an enclosed, generally planar circular bottom end. The bottom end includes an upper surface and a lower surface. A stationary base is formed of a flat plate and a stationary tub. The plate is formed in a planar configuration with an upper surface and a lower surface. The upper surface includes an upwardly extending, generally cylindrically shaped tub. The tub has an open top section and a bottom section positioned on top of the upper surface of the plate. A locking mechanism securely couples the bowl in the operative orientation upon the base.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
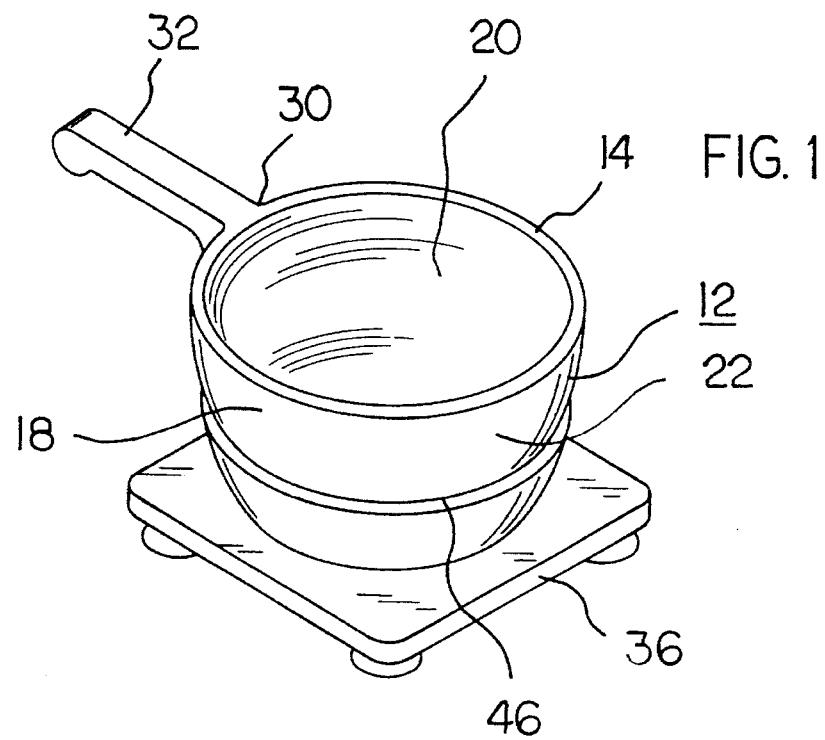
FIG. 1 is a perspective view of the preferred embodiment of the culinary assembly with an interlocking bowl and base constructed in accordance with the principles of the present invention.
Figure 2:
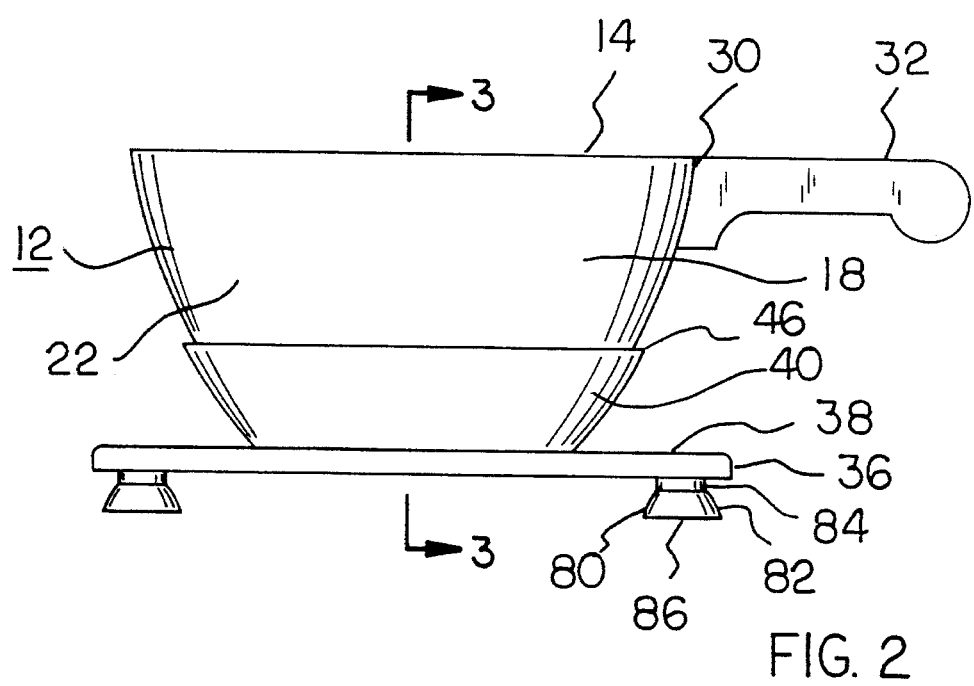
FIG. 2 is a side elevational view of the culinary assembly shown in FIG. 1.
Figure 3:
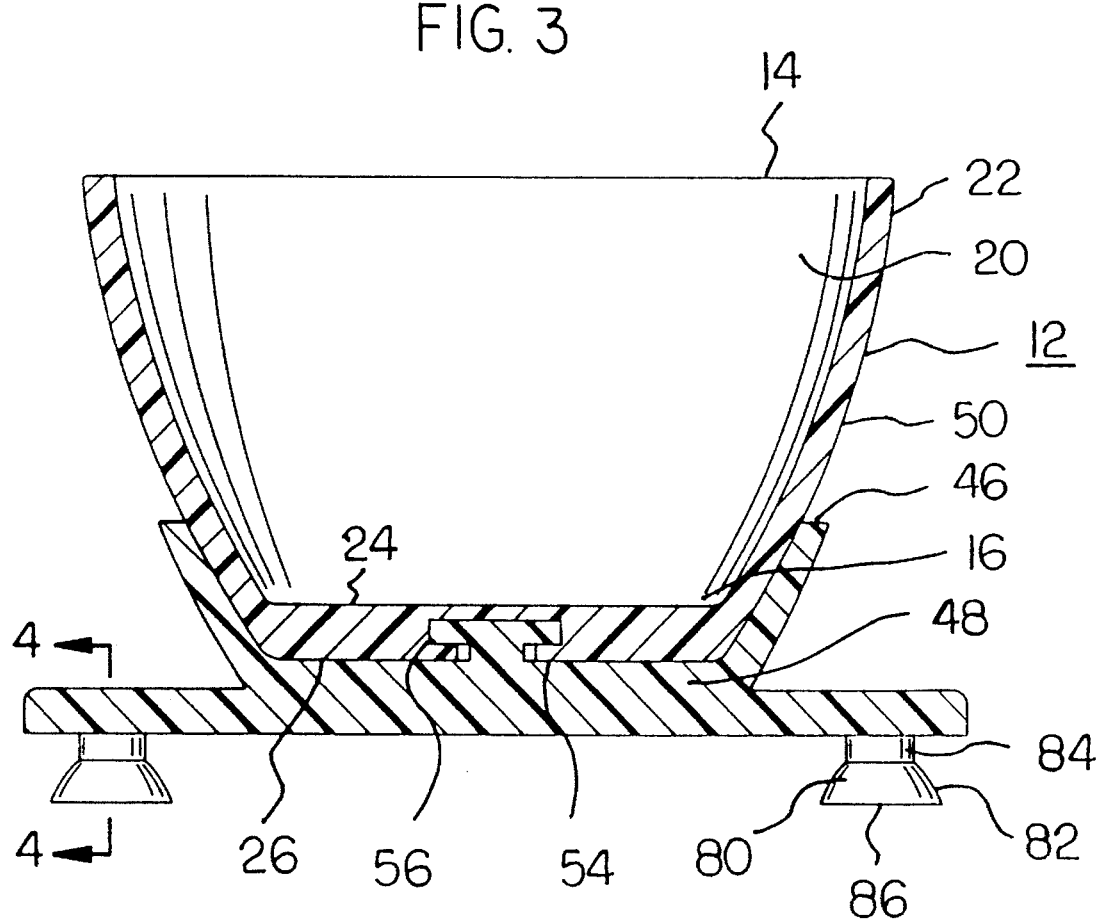
FIG. 3 is a cross sectional view of the apparatus taken along line 3—3 of FIG. 2.
Figure 4:
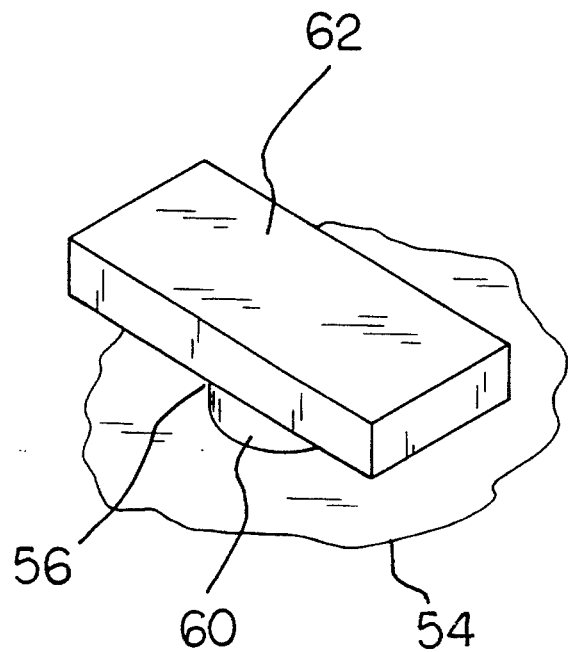
FIG. 4 is a broken away exploded cross sectional view of the stationary base and suction cup taken along line 4—4 of FIG. 3.
Figure 5:
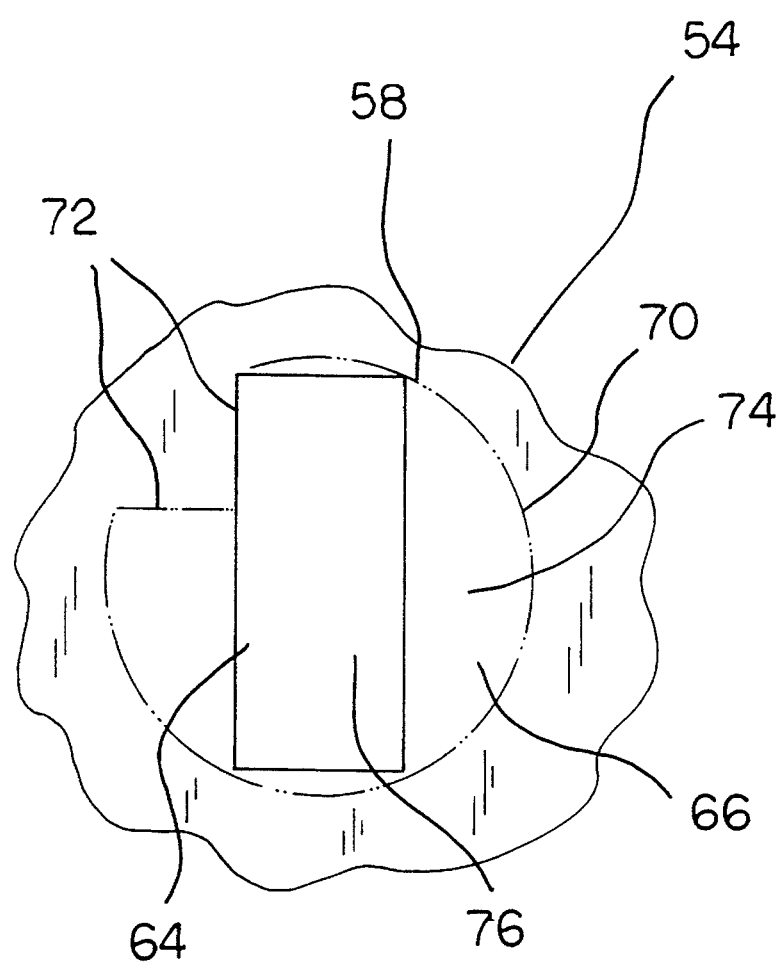
FIG. 5 is a broken away exploded view of the tang of the locking mechanism.
Figure 6:
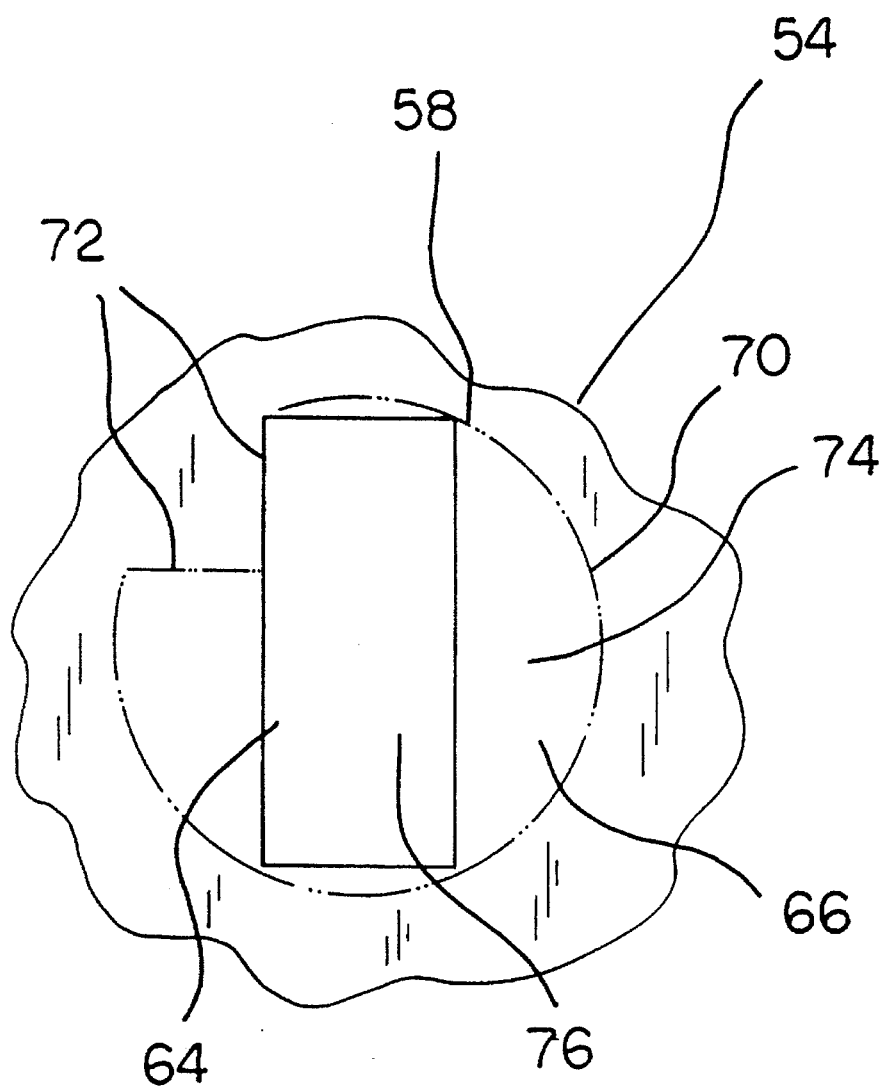
FIG. 6 is a broken away exploded view of the undercut aperture of the locking mechanism.

With reference now to the drawings, and in particular to FIG. 1 thereof, the preferred embodiment of the new and improved culinary assemblies with an interlocking bowl and base embodying the principles and concepts of the present invention and generally designated by the reference numeral 10 will be described.

Specifically, it will be noted in FIGS. 1 through 6, that there is provided a new and improved culinary assembly with an interlocking bowl and base. The culinary assembly 10, in its broadest context, comprises a bowl 12, a stationary base 36, a lock mechanism 54 and four suction cups 80.

More specifically, the bowl 12 is formed in a hollow generally cylindrical configuration with an open top end 14 and an enclosed, generally planar circular bottom end 16. The interior of the bowl is rounded to aid removal of contents after cooking. The top end 14 has a larger circumference than the bottom end 16, with the side wall 18 of the bowl having a gradually decreasing circumference therebetween. The bowl is large enough to hold a large quantity of food or liquid. The sidewall 18 includes an inner surface 20 and an outer surface 22 with a small thickness therebetween. The bottom end has an upper surface 24 and a lower surface 26 with a large thickness therebetween. The bowl 12 includes coupling means 30 located in a small area near its top end. The bowl 12 also includes a generally rectangular shaped handle 32 affixed near its open top end. The handle 32 is of a sufficient length for a user to grip comfortably. The handle has a smooth central portion and an enlarged rounded outer portion to help prevent slippage when holding. Note in particular FIGS. 1 through 3.

A stationary base 36 is formed of a flat plate 38 and a stationary tub 40. The plate 38 is formed in a planar generally rectangular configuration with parallel long sides and parallel short sides. The plate 36 has an upper surface 42 and a lower surface 44. The plates has rounded edges at each of its four corners to prevent scratching. Note in particular FIGS. 1 through 3.

The upper surface 42 of the plate includes an upwardly extending generally cylindrically shaped tub 40 emanating from its center. The tub 40 has an open top section 46 and a bottom section 48 formed contiguously with the upper section of the plate. The top section 46 has a larger circumference than the bottom section 48, with the cylindrical side wall 50 of the tub having a gradually decreasing circumference therebetween. The tub is adapted to receive the bowl in the operative orientation and therefore has a slightly larger circumference than the bowl. Note in particular FIG. 1.

A lock mechanism 54 includes a releasably coupled tang 56 and an undercut recess 58. The tang 56 extends upwardly from the central portion of the bottom section 48 of the tub and is formed in T-shaped configuration. The tang 56 has a generally cylindrical shaped lower portion 60 which is contiguous with a rectangular shaped upper portion 62. The lower portion 60 is affixed to the bottom section 48 of the tub and has a short vertical height. The upper portion 62 has parallel long sides, parallel short sides and a small thickness. Note FIGS. 3 and 5.

The recess 56 is centrally located in the lower surface 26 of the bottom end of the bowl. The outermost portion 64 of the recess is contiguous with the lower surface 26 of the bottom section and shaped in a generally rectangular configuration with parallel long sides and parallel short sides. The innermost portion 66 of the recess is located deeper within the bottom section than the outermost portion 64. The innermost portion 66 is formed in a hollow, generally cylindrical configuration with a long, generally circular side 70, and two short straight sides 72 angled toward the axis of the cylinder. The two short sides 72 meet to form right angles. The innermost portion 66 has a roof section 74 with a generally rectangular shaped opening 76 formed contiguously with the generally rectangular shaped outermost portion 64 of the recess. The tang 54 is adapted to be securely positioned within the undercut recess 58 when in the operative orientation. In order to place the apparatus in the locked orientation the user simply aligns the tang and rectangular portion of the recess. The user then lowers the tang inside the recess and turns the bowl in a clockwise direction to lock in place. Users may now stir the contents of the bowl in a clockwise direction without spinning the bowl. Note FIG. 6 in particular.

Four suction cups 80 are affixed to the lower surface 44 of the stationary base near each of its four corners. Each cup 80 is shaped in a generally semi-spherical configuration 82 with its rounded end 84 affixed to the base. The open end 86 of each cup 80 is adapted to securely stick to a mounting surface. Applying pressure to the upper surface of the plate forces the suction cups to stick to an appropriate mounting surface. The mounted base provides a stable surface upon which to place the bowl when stirring is desired. Note FIGS. 2 and 3 in particular.

The culinary assembly with an interlocking bowl and base is adapted to be used by a handicapped person who is unable to use both hands, or any person who has one arm occupied while cooking. Mothers holding young children may find this device especially useful. Assembly of the apparatus is very simple. First the user secures the base on a mounting surface such as a counter top or kitchen table. The suction cups on the lower surface of the base are adapted to securely stick to a variety of different surfaces upon application of pressure to the upper surface of the base. The bowl is adapted to be positioned inside the tub on the top of the base. The user simply aligns the rectangular portion of the undercut groove on the bowl with the rectangular tang on the bottom section of the tub. Once aligned, the user simply lowers the tang inside the recess and turns the bowl in a clockwise direction to place the apparatus in the locked position. The user may now stir the contents of the bowl in a clockwise direction with one hand without spinning the bowl. To remove the bowl from the base the user simply turns the bowl in a counter clockwise direction and lifts. The culinary assembly with an interlocking bowl and base is a very useful devise for anyone who has use of only one arm during cooking.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved culinary assembly with an interlocking bowl and base comprising, in combination:

a bowl, the bowl being formed in a hollow generally cylindrical configuration with an open top end and an enclosed generally planar circular bottom end, the top end having a larger circumference than the bottom end, with the side wall of the bowl having a gradually decreasing circumference therebetween, the sidewall including an inner surface and an outer surface with a small thickness therebetween, the bottom end having an upper surface and a lower surface with a large thickness therebetween, the bowl including coupling means located in a small area near its top end, the bowl also including a generally rectangular shaped handle affixed near its open top end, the handle being of a sufficient length for a user to grip comfortably;

a stationary base being formed of a flat plate and a stationary tub, the plate being formed in a planar generally rectangular configuration with parallel long sides and parallel short sides, the plate having an upper surface and a lower surface, the upper surface including an upwardly extending generally cylindrically shaped tub, the tub having an open top section and a bottom section formed contiguously with the upper section of the plate, the top end having a larger circumference than the bottom end with the cylindrical side wall of the tub having a gradually decreasing circumference therebetween;

a lock mechanism, the lock mechanism including a releasably coupled tang and an undercut recess, the tang extending upwardly from the bottom section of the tub and formed in T shaped configuration, the tang having a generally cylindrical shaped lower portion contiguous therewith and a rectangular shaped upper portion, the lower portion being affixed to the bottom section of the tub and having a short vertical height, the upper portion having parallel long sides and parallel short sides and a small thickness, the recess being centrally located in the lower surface of the bottom end, with the outermost portion of the recess being contiguous with the lower surface of the bottom section and shaped in a generally rectangular configuration with parallel long sides and parallel short sides, with the innermost portion of the recess being located deeper within the bottom section than the outermost portion, the innermost portion being formed in a hollow generally cylindrical configuration with a long generally circular side and two short straight sides angled toward the axis of the cylinder, with the two short sides meeting to form right angles, the innermost portion having a roof section with a generally rectangular shaped opening formed contiguously with the generally rectangular shaped outermost portion of the recess, the tang adapted to be securely positioned within the undercut recess when in the operative orientation; and four suction cups, the suction cups being affixed to the lower surface of the stationary base near each of its four corners, each cup being shaped in a generally semispherical configuration with its rounded end affixed to the base, the open end of each cup being adapted to securely stick to a mounting surface.

2. A culinary assembly with an interlocking bowl and base comprising:

a bowl formed in a hollow generally cylindrical configuration with an open top end and an enclosed generally planar circular bottom end, the bottom end having an upper surface and a lower surface, the ratio of the diameter of the open top end to the depth of the bowl being about 2 to 1, the bowl including at least one handle formed in an elongated configuration;

a stationary base being formed of a flat plate and a stationary tub, the plate being formed in a planar configuration, the plate having an upper surface and a lower surface, the lower surface including four suction cups adapted to permit secure coupling to a mounting surface in an operative orientation, the upper surface including an upwardly extending generally cylindrically shaped tub, the tub having an open top section and a bottom section affixed to the upper surface of the plate; and a locking mechanism formed as a T-shaped tang and a recess, the tang having a short vertical height and extending upwardly from the bottom section of the tub, an undercut recess being positioned in the lower surface of the bottom end of the tub, the recess permitting releasable coupling with the tang upon rotational movement thereof.

* * * * *